United States Patent
Sawey

(10) Patent No.: US 7,151,777 B2
(45) Date of Patent: Dec. 19, 2006

(54) CROSSPOINT SWITCH HAVING MULTICAST FUNCTIONALITY

(75) Inventor: David C. Sawey, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 10/116,891

(22) Filed: Apr. 4, 2002

(65) Prior Publication Data

US 2003/0189942 A1 Oct. 9, 2003

(51) Int. Cl.
*H04L 12/56* (2006.01)

(52) U.S. Cl. ........................................ 370/413; 370/390

(58) Field of Classification Search ................ 370/390, 370/389, 412, 413, 414, 416, 418, 235, 357, 370/395.4; 710/317
See application file for complete search history.

(56) References Cited

U.S. PATENT DOCUMENTS

| | | | | |
|---|---|---|---|---|
| 4,623,996 A | * | 11/1986 | McMillen | 370/418 |
| 5,691,984 A | | 11/1997 | Gardner et al. | 370/401 |
| 5,742,597 A | | 4/1998 | Holt et al. | 370/390 |
| 5,805,589 A | * | 9/1998 | Hochschild et al. | 370/389 |
| 5,825,767 A | | 10/1998 | Mizukoshi et al. | 370/395 |
| 5,835,491 A | | 11/1998 | Davis et al. | 370/386 |
| 5,923,656 A | | 7/1999 | Duan et al. | 370/395 |
| 5,991,867 A | | 11/1999 | Fosmark | 712/16 |
| 6,128,654 A | | 10/2000 | Runaldue et al. | 709/219 |
| 6,141,346 A | | 10/2000 | Caldara et al. | 370/390 |
| 6,188,690 B1 | | 2/2001 | Holden et al. | 370/390 |
| 6,477,174 B1 | * | 11/2002 | Dooley et al. | 370/416 |
| 6,515,991 B1 | * | 2/2003 | McKeown | 370/390 |
| 6,532,234 B1 | * | 3/2003 | Yoshikawa et al. | 370/395.4 |
| 6,606,326 B1 | * | 8/2003 | Herring | 370/412 |
| 6,721,273 B1 | * | 4/2004 | Lyon | 370/235 |
| 6,970,455 B1 | * | 11/2005 | Garg et al. | 370/357 |
| 2001/0021174 A1 | | 9/2001 | Luijten et al. | 370/229 |
| 2001/0021191 A1 | | 9/2001 | Isoyama et al. | 370/392 |
| 2001/0025332 A1 | | 9/2001 | Wang et al. | 710/132 |
| 2001/0033581 A1 | | 10/2001 | Kawarai et al. | 370/468 |
| 2002/0039366 A1 | * | 4/2002 | Sano | 370/390 |
| 2002/0099900 A1 | * | 7/2002 | Kawarai et al. | 710/317 |

FOREIGN PATENT DOCUMENTS

JP 09168016 A 6/1997

OTHER PUBLICATIONS

Yoshigoe, et al., *A Parallel-Polled Virtual Output Queued Switch with a Buffered Crossbar*, Department of Computer Science and Engineering, Univ. of South Florida, National Science Foundation under Grant No. 9875177.

Christensen, *Design and Evaluation of a Parallel-Polled Virtual Output Queued Switch*, Department of Computer Science and Engineering, Univ. of Science and Engineering, Univ. of South Florida, National Science Foundation under Grant No. 9875177.

Schoenen, *An Architecture Supporting Quality-of-Service in Virtual-Output-Queued Switches*, IEICE/IEEE Joint Special Issue on Recent Progress in ATM Technologies, IEICE Trans. Comm., vol. E83-B, No. 2, Feb. 2000.

\* cited by examiner

*Primary Examiner*—Hassan Kizou
*Assistant Examiner*—Albert T. Chou
(74) *Attorney, Agent, or Firm*—Baker Botts L.L.P.

(57) ABSTRACT

A crosspoint switch uses an iterative process to deliver multicast packets from inputs to outputs. The switch includes output queues dedicated to the inputs, with backpressure indications provided from the output queues to the corresponding inputs. The inputs use the backpressure indications to schedule multicast packets for delivery to one or more of the output queues.

25 Claims, 4 Drawing Sheets

CROSSPOINT SWITCH HAVING MULTICAST FUNCTIONALITY

TECHNICAL FIELD OF THE INVENTION

The present invention relates generally to packet switching and, more particularly, to a crosspoint switch having multicast functionality.

BACKGROUND OF THE INVENTION

In communication systems, switches provide interconnections between input ports and output ports and transmit packets from input ports to appropriate output ports. In certain circumstances, a switch may receive packets for communication from a single receiving input port to multiple output ports. Various techniques for supporting these port-to-multiport communications include a centralized scheduler and a dedicated multicast link between the input and output ports.

SUMMARY OF THE INVENTION

In accordance with the present invention, techniques for providing crosspoint switching with multicast functionality are provided which substantially reduce or eliminate problems associated with previous techniques.

According to a particular embodiment, a switch includes N inputs and M outputs, with each of the outputs having N output queues corresponding to the N inputs. Each of the inputs can receive a multicast packet for delivery to at least two recipient ones of the outputs, queue the multicast packet, determine available ones of the recipient outputs, wherein an available recipient output has availability in the output queue corresponding to the input receiving the multicast packet, schedule the multicast packet for communication to the available recipient outputs, and re-queue the multicast packet for delivery to remaining ones of the recipient outputs that were not available.

Embodiments of the invention provide various technical advantages. The disclosed switch provides for distributed scheduling of packets for switching from input ports to output ports. Moreover, the multicasting functionality leverages the inherent replicating ability of the switch while accounting for the inevitable unavailability of some destination ports during selected multicast transmissions. For example, at each appropriate opportunity, the switch may deliver copies of a multicast packet to all available output ports indicated as recipients of the packet, with the switch repeating the process until all recipients have received a copy. Using the disclosed techniques, the switch potentially provides for multicast transmissions with minimal increased bandwidth usage as compared to unicast transmissions.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
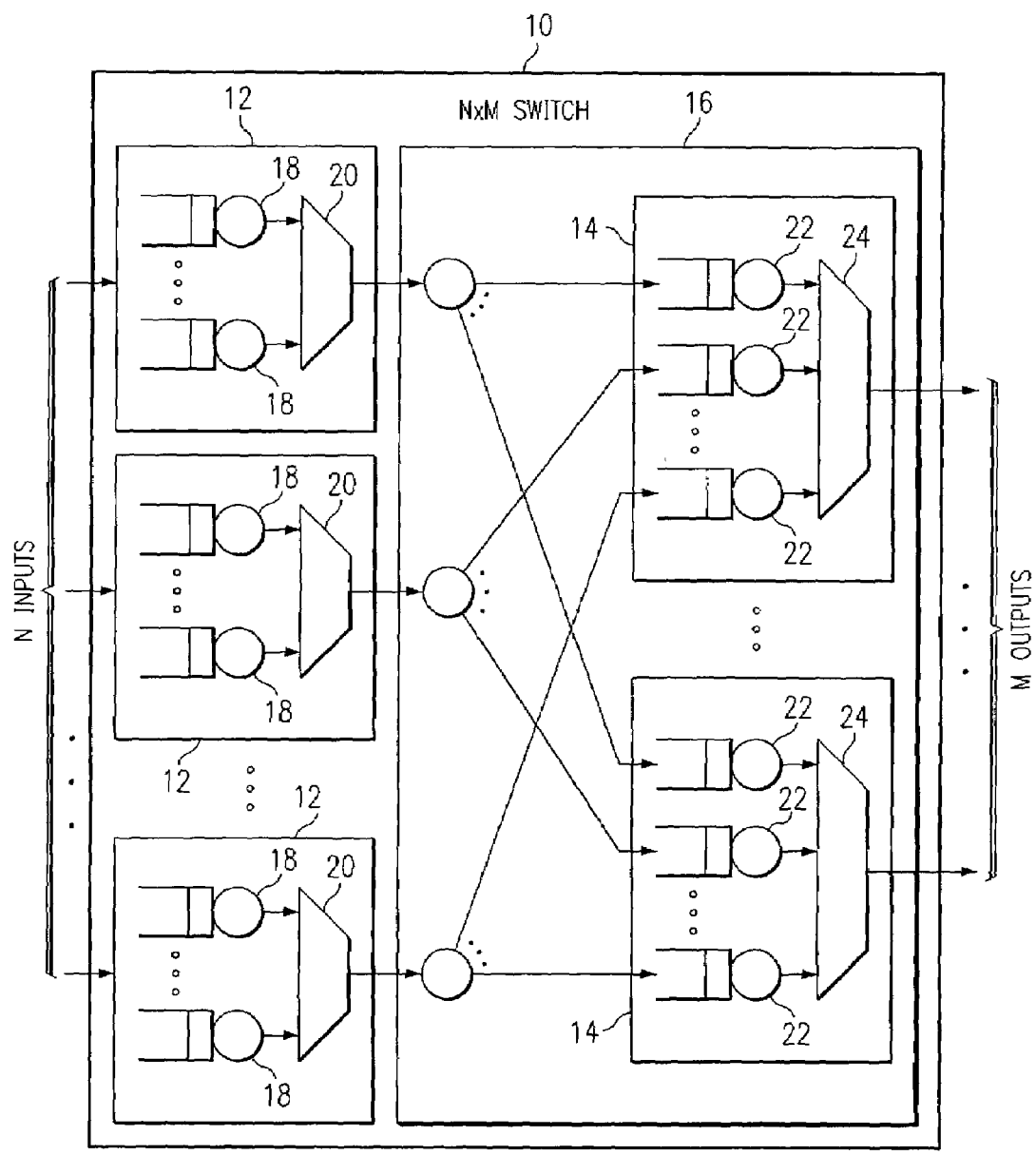
FIG. 1 illustrates logical elements of a switch supporting multicasting according to particular embodiments of the present invention.

FIG. 1 is a block diagram illustrating functional elements of a crosspoint switch 10. In the embodiment illustrated, switch 10 includes N inputs and M outputs. Thus, switch 10 may be characterized as an N×M switch. For each input, switch 10 includes an input module 12, and for each output, switch 10 includes an output module 14. In addition, switch 10 includes a switching fabric 16 for transmitting packets from input modules 12 to output modules 14. Each of the N input modules 12 includes M input queues 18 and a multiplexor 20. Each of the M output modules 14 includes M output queues 22 and a multiplexor 24. In general, each switch 10 processes packets, transmitting the packets across fabric 16 to one or more output modules 14. More specifically, using input queues 18, output queues 22, and an iterative process, switch 10 supports multicasting of packets from individual input modules 12 to multiple output modules 14.

Switch 10 represents hardware, including any appropriate controlling logic, for switching packets received at input modules 12 to output modules 14. In the embodiment illustrated, switch 10 uses fabric 16 for the transmission of packets from input modules 12 to output modules 14. At each transmission opportunity (timeslice), fabric 16 may transmit a packet from each input module 12 and deliver each packet to appropriate output queues 22 at one or more output modules 14. Thus, fabric 16 can replicate packets, sending copies of a single packet from one input module 12 to appropriate output queues 22 at more than one output module 14. However, the term packet should be understood to denote any suitable frame, cell, and/or other segmentation of data.

In the embodiment illustrated, switch 10 includes N inputs. Thus, switch 10 may simultaneously receive up to N input signals. Similarly, in the embodiment illustrated, switch 10 supports M outputs. Thus, switch 10 may simultaneously communicate signals on up to M outputs. Therefore, as used in this description, N and M represent integer variables.

Within each input module 12, the M input queues 18 correspond to the M output modules 14. Similarly, within each output module 14, the N output queues 22 correspond to the N input modules 12. Thus, in effect, switch 10 establishes a one-to-one relationship between input queues 18 and output queues 22. For example, the first input queue 18 within the first input module 12 corresponds to the first output queue 22 in the first output module 14. Likewise, the last input queue 18 within the first input module 12 corresponds to the first output queue 22 within the last output module 14. A specific example illustrating these relationships is provided below with respect to FIG. 2.

In operation, switch 10 receives packets at input modules 12 and transmits these packets across fabric 16 to output modules 14. Packets processed by switch 10 may include unicast and/or multicast packets. Upon receiving a unicast packet, the receiving input module 12 determines the appropriate output module 14 and places the packet into input queue 18 corresponding to the identified output module 14. The packets within input queues 18 are then serviced by multiplexor 20.

Thus, within each input module 12, multiplexor 20 selects one of input queues 18 to service for each timeslot and schedules a packet from the selected input queue 18. According to particular embodiments, multiplexor 20 uses a round-robin algorithm to identify the next input queue 18 with packets for transmission across switch 10. However, switch 10 contemplates multiplexors 20 using any suitable algorithms and information to identify a potential next input queue 18 to service. Upon identifying a potential input queue 18, multiplexor 20 uses backpressure to ensure that output queue 22 corresponding to the identified input queue 18 is available. That is, before selecting an input queue 18 to service, multiplexor 20 determines whether the corresponding output queue 22 has capacity to accept another packet. Therefore, when an input queue 18 is selected, delivery to the corresponding output queue 22 is guaranteed.

Within output modules 14, multiplexors 24 govern the output. That is, within a particular output module 14, multiplexor 24 selects among output queues 22 to determine a particular output queue 22 from which to transmit a packet. According to particular embodiments, multiplexors 24 use a round-robin technique to select among output queues 22 that have packets to be communicated. However, similar to multiplexors 20, multiplexors 24 may use any suitable algorithm for selecting output queues 22 to service.

For received multicast packets, switch 10 uses a potentially iterative process to ensure delivery of the packets to all appropriate output modules 14. Upon receiving a multicast packet, the receiving input module 12 identifies those output modules 14 indicated to receive a copy of the packet. For example, input module 12 may access a table mapping multicast addresses to output modules 14. Using the table, input module 12 can determine the particular output modules 14 indicated based upon the multicast address within the received packet. Input module 12 uses this mapping information to generate a port map identifying those output modules 14 that should receive a copy of the packet. Input module 12 associates this port map with the multicast packet, for example, by appending the port map as a pre-header to the packet. After identifying output modules 14 indicated by the multicast address of the multicast packet, input module 12 selects one of the identified output modules 14 and places the multicast packet into input queue 18 corresponding to the selected output module 14. The multicast packet then awaits selection by multiplexor 20.

When the multicast packet reaches the head of input queue 18 that is selected for service, multiplexor 20 performs additional steps with respect to the multicast packet as compared to the processing of a unicast packet. As previously discussed, when multiplexor 20 selects input queue 18 to service, delivery of the packet from the selected input queue 18 to its corresponding output queue 22 is virtually guaranteed, since input module 12 uses backpressure to verify availability of the corresponding output queue 22. Thus, when multiplexor 20 selects input queue 18 of the multicast packet, delivery to at least one of the appropriate output modules 14 is virtually guaranteed.

Upon identifying the selected packet as a multicast packet, multiplexor 20 accesses the port map associated with the multicast packet to determine all output modules 14 scheduled to receive a copy of the packet. Using backpressure indications from each of the identified output modules 14, multiplexor 20 identifies those output modules 14 for which the corresponding output queue 22 is available. Multiplexor 20 then schedules the multicast packet for delivery to each of the available output modules 14 in the next timeslice. Thus, in the next timeslice, switch 10 uses the replication capabilities of fabric 16 to deliver copies of the multicast packet to all available output queues 22 of indicated output modules 14. Because multiplexor 20 only selects to service an input queue 18 given the availability of the corresponding output queue 22, this step guarantees the delivery of the multicast packet to at least one of the appropriate output modules 14, and potentially delivers copies of the packet to all appropriate output modules 14.

If not all output modules 14 indicated in the port map are available, multiplexor 20 re-queues the multicast packet for delivery to the remaining output modules 14. To re-queue the packet, multiplexor 20 identifies the remaining output modules 14, modifies the port map to reflect the remaining output modules 14, selects an input queue 18 for one of the remaining output modules 14, and queues the multicast packet in the selected input queue 18. Therefore, each time multiplexor 20 services a multicast packet, the multicast packet will be delivered to one or more output modules 14 that remain to receive a copy of the packet.

Figure 2:
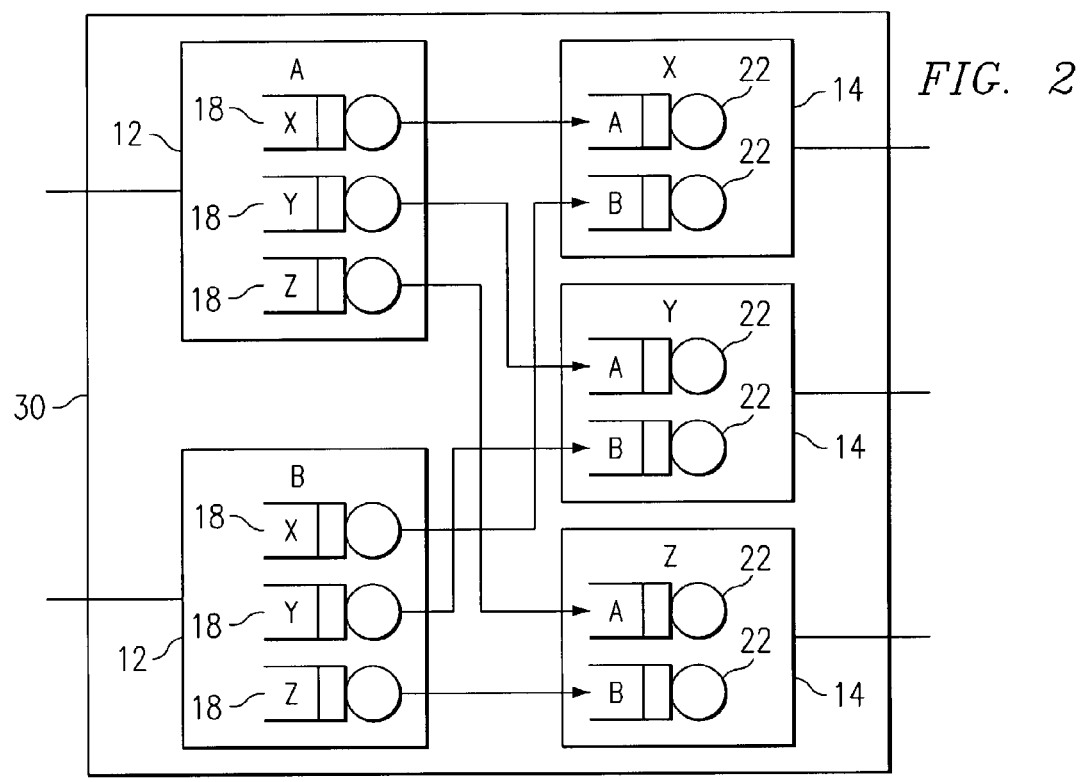
FIG. 2 is a logical diagram illustrating relationships between input queues and output queues within an exemplary switch.

FIG. 2 is a block diagram illustrating a 2×3 switch, indicated at 30, that demonstrates the relationships between input queues 18 and output queues 22. In the example illustrated, switch 30 includes two input modules 12 labeled A and B (input A and input B). Switch 30 also includes three output modules 14 labeled X, Y, and Z (output X, output Y, and output Z). Because switch 30 includes three output modules 14, each input module 12 includes three input queues 18. Similarly, because switch 30 includes two input modules 12, each output module 14 includes two output queues 22.

Within each input module 12, input queues 18 are labeled according to the corresponding output module 14. Thus, each input module 12 includes input queue X, input queue Y, and input queue Z. For convenience, this description will refer to input queues using the notation "input queue A-X" to refer to, for example, input queue 18 labeled X on input module 12 labeled A. Similarly, "output queue X-A" refers to output queue 22 labeled A on output module 14 labeled X.

As illustrated by switch 30 in this example, input queues 18 and output queues 22 share a one-to-one correlation. This enables distribution of scheduling tasks among input modules 12. For example, input A handles selection and scheduling of transmissions for all packets received at input A, while input B handles selection and scheduling of packet transmissions for all packets received at input B.

To illustrate the operation of switch 30 in handling multicast packets, consider a multicast packet received by input B, with the multicast address indicating outputs X, Y, and Z as recipients. Upon receiving the packet, input B determines the recipient output modules 14 based upon the multicast address within the packet. Upon identifying the recipients as output X, Y, and Z, input B generates a port map identifying these recipients and associates the port map with the multicast packet. Input B also selects an input queue 18 corresponding to one of the recipients. Input B may use any suitable techniques for selecting among the input queues 18. For example, input B may choose based upon criteria such as shortest queue length. For this example, input B selects to place the multicast packet into input queue B-X.

At some point, the multicast packet will reach the head of input queue B-X, and input B will select to service input queue B-X. As previously discussed, input B selects to service a particular input queue 18 only upon the availability of the corresponding output queue 22. Thus, when input B selects to service input queue BX, output queue X-B is available.

Upon selecting to service the multicast packet, input B also accesses the port map associated with the multicast packet to identify other potential recipients. In this case, the port map indicates that outputs Y and Z should also receive a copy of the packet. Using this information, input B determines the availability of the other recipients. That is, input B determines the availability of output queue Y-B and output queue Z-B. Assume for this example that output queue Y-B is unavailable. In this circumstance, input B schedules the packet for delivery to output X and output Z. Therefore, during the next transmission timeslice, switch 30 will deliver copies of the packet to output queue X-B and output queue Z-B.

Input B modifies the port map associated with the multicast packet to indicate the remaining recipients and re-queues the multicast packet into input queue 18 for one of these remaining recipients. In this case, output Y is the sole remaining recipient. Thus, input B adjusts the port map to reflect Y as the remaining recipient and queues the multicast packet in input queue B-Y.

This example illustrates one cycle of the iterative process used by switch 30 to deliver a multicast packet from a receiving input module 12 to multiple recipient output modules 14. However, while the illustration and accompanying description provide specific examples, switch 30 and switch 10 contemplate any appropriate operation and correlation between input queues 18 and output queues 22 to provide distributed scheduling of multicast packets using backpressure indications to ensure transmission of packets to available output queues 22. For example, while switch 10 and switch 30 each display input modules 12 having multiple input queues 18, similar techniques for distributing scheduling may be accomplished using other queuing structures within input modules 12. Thus, a single queue within each input module 12 can be used, so long as each input module 12 has access to backpressure information specific to that input module 12. This backpressure information enables each input module 12 to individually and independently determine scheduling of packets for communication to output modules 14.

Moreover, according to another embodiment, input modules 12 use an input queue "race" technique, in which a multicast packet is placed into input queues 18 corresponding to all recipient output queues 22. Thus, the multicast packet is serviced upon reaching the head of any of the selected input queues 18. When one of these input queues 18 is serviced by multiplexor 20, input module 12 removes the multicast packet from input queues 18 corresponding to output queues 22 that received a copy of the multicast packet. Thus, the multicast packet will remain in input queues 18 corresponding to output queues 22 that were not available to receive a copy of the multicast packet, but will be removed from input queues 18 corresponding to the available output queues 22. Using this technique, the ordering of packets in a single stream can be maintained while reducing the overall queuing time for a single multicast packet.

However, while this description provides specific examples in which input module 12 selects a single corresponding input queue 18 or selects all corresponding input queues 18, switch 10 contemplates input module 12 using any suitable criteria or algorithms to select one or more of input queues 18 corresponding to recipient output queues 22.

Figure 3:
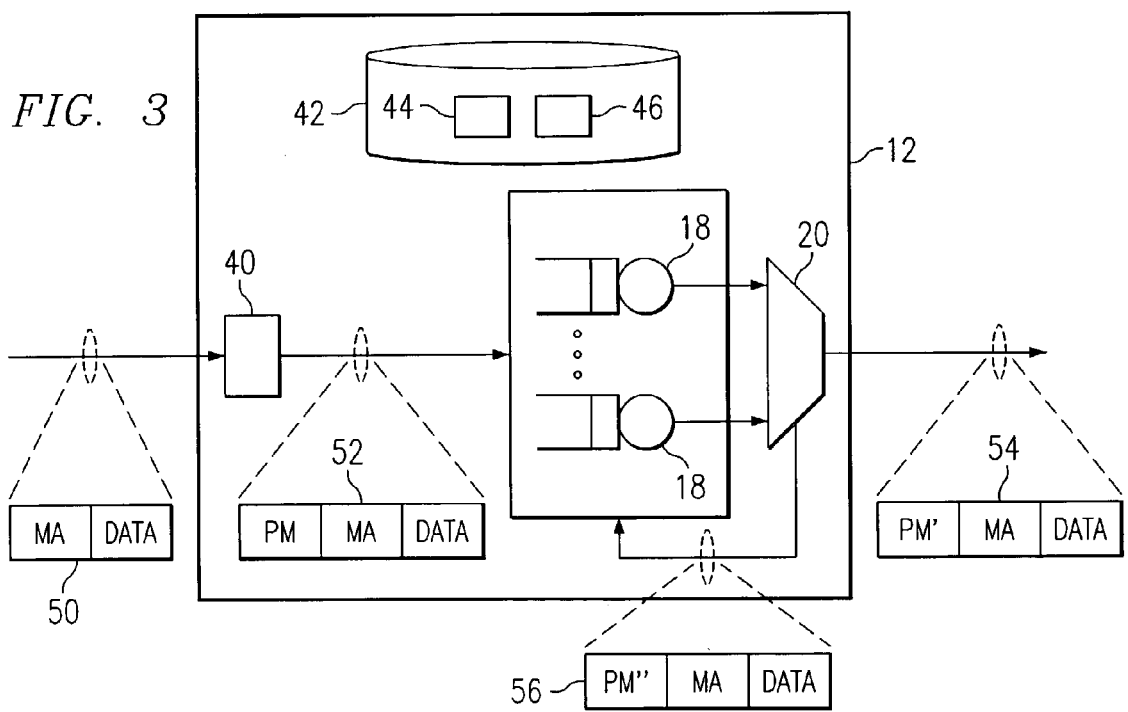
FIG. 3 is a block diagram illustrating, in greater detail, logical elements of an input module of the switch.

FIG. 3 is a block diagram illustrating in greater detail functional elements of input module 12. In the embodiment illustrated, input module 12 includes input queues 18 and multiplexor 20 in addition to an input processor 40 and a memory 42, which maintains multicast mapping information 44 and output availability information 46. Multicast mapping information 44 represents tables, databases, and/or other suitable information for use in identifying recipient output modules 14 based on addressing information within received packets. However, while shown as maintained within memory 42, switch 10 contemplates obtaining and maintaining this information from or using any appropriate local and/or remote elements.

Availability information 46 represents any suitable database entries, tables, logic, circuitry, and/or other suitable element indicating availability of output queues 22 that correspond to this particular input module 12. For example, using the example provided by FIG. 2, availability information 46 within input A will reflect the current availability of output queue X-A, output queue Y-A, and output queue Z-A. That is, availability information 46 reflects whether space in these output queues 22 is available to receive a packet. Output queues 22 may provide this information to input module 12 using any suitable techniques. For example, if availability information 46 is implemented as a table, appropriate output queues 22 may update the table to reflect availability for the next timeslice within switch 10. Similarly, if availability information 46 is implemented using individual electrical leads from each output queue 22, output queues 22 may provide on and off signals to indicate availability for an upcoming timeslice. Thus, as illustrated by these examples, switch 10 contemplates input modules 12 using any suitable techniques for maintaining and obtaining availability information 46.

The embodiment illustrated tracks the progress of an exemplary multicast packet passing through input module 12. As indicated at 50, a multicast packet enters input module 12 and is received by input processor 40. When received the multicast packet includes a multicast address (MA). Input processor 40 uses the multicast address to determine output modules 14 indicated as recipients. For example, input processor 40 may access multicast mapping information 44 using the multicast address to determine appropriate recipients. Input processor 40 generates a port map indicating the determined recipients and associates this port map with the multicast packet. Switch 10 contemplates input modules 12 using any appropriate format for these port maps. For example, input module 12 may implement port maps using bitmaps to identify recipients. For example, consider switch 10 having eight output modules 14. Input module 12 may use a one byte value to indicate the recipient output modules 14, setting each bit of the byte to one or zero to indicate whether or not a corresponding output module 14 is a recipient. However, the preceding example provides only a particular embodiment for implementing port maps, and switch 10 contemplates using any suitable techniques.

After generating and associating the port map with the multicast packet, input processor 40 selects an input queue 18 corresponding to one of the recipients and queues the multicast packet within the selected input queue 18. Thus, as indicated at 52, input processor 40 queues the multicast packet with the associated port map (PM) into one of input queues 18 corresponding to one of the recipients of the multicast packet.

As previously discussed, multiplexor 20 handles selection and processing of multicast packets from input queues 18. After selecting to process the multicast packet previously queued by input processor 40, multiplexor 20 determines the identified recipients that are available to receive copies of the multicast packet. For example, multiplexor 20 may access availability information 46 to determine the recipient output modules 14 with availability in appropriate output queues 22. Multiplexor 20 then schedules the multicast packet for transmission to available recipients. For example, multiplexor 20 may generate a revised port map (PM') that indicates recipients currently available to receive a copy of the multicast packet. Thus, as indicated at 54, multiplexor 20 may schedule the multicast packet for communication to available recipients by associating the revised port map with the multicast packet.

As previously discussed, multiplexor 20 also re-queues the multicast packet if some recipients are unavailable. In the example illustrated, multiplexor 20 generates a remaining recipients port map (PM') and associated this port map with the multicast packet, as indicated at 56. Multiplexor 20 selects an input queue 18 corresponding to one of the remaining recipients and queues the multicast packet with the associated, modified port map in the selected input queue 18. Input module 12 iterates this process until copies of the multicast packet are delivered to all recipient output modules 14.

While the embodiments illustrated and the preceding description focus on particular embodiments of switch 10, switch 30, and input module 12 that include specific elements, one of skill in the art will recognize that the functionalities and processes described may be achieved using any suitable combination and arrangement of elements. Moreover, some or all of the functionalities may be implemented using logic encoded in media, such as software, program logic devices, and/or suitable encoded logic.

Figure 4:
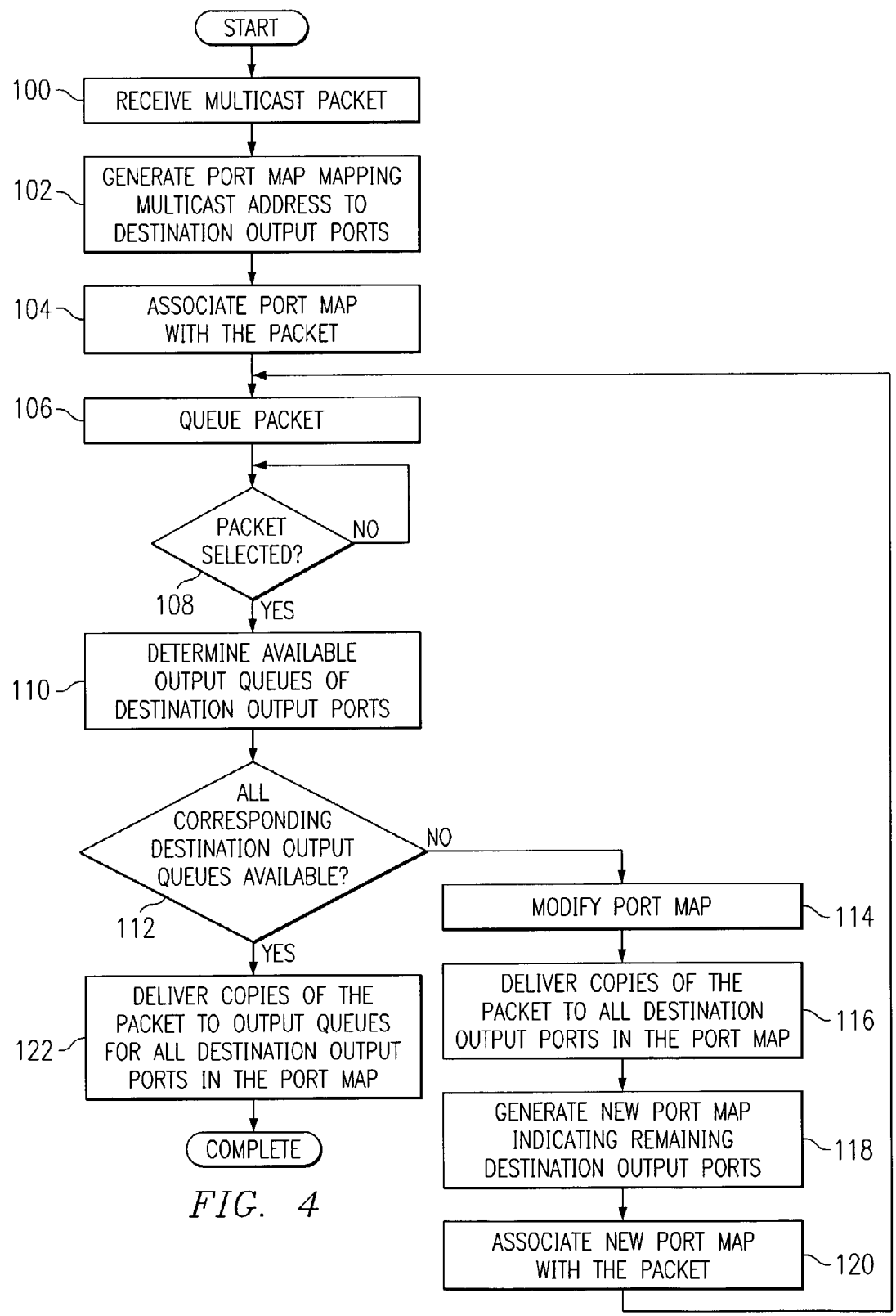
FIG. 4 is a flowchart illustrating the progression of a multicast packet within an input module.

FIG. 4 is a flowchart illustrating the progression of a multicast packet within input module 12. Input module 12 receives the multicast packet at step 100. Input module 12 then generates a port map mapping the multicast address of the multicast packet to destination output ports at step 102. For example, as previously discussed, input processor 40 may access multicast mapping information 44 to identify output modules 14 indicated by the multicast address. With this information, input processor 40 can generate the port map indicating the appropriate recipients. Input processor 40 associates the generated port map with the multicast packet at step 104 and queues the packet at step 106. To queue the packet, input processor 40 selects an input queue 18 corresponding to one of the destination output modules 14 and places the packet into the selected input queue 18.

At step 108, the flowchart models the period of time that the multicast packet awaits selection within input queue 18. Thus, when appropriate, multiplexor 20 selects the packet at step 108. After selecting the packet, multiplexor 20 determines available output queues 22 of destination output modules 14 at step 110. For example, multiplexor 20 may access availability information 46 to determine availability of appropriate output queues 22 at recipient output modules 14. If all corresponding destination output queues 22 are available at step 112, switch 10 delivers copies of the packet to output queues 22 for all destination output ports in the port map at step 122 and processing of this multicast packet is complete. However, if multiplexor 20 determines that all corresponding destination output queues 22 are not available at step 112, multiplexor 20 modifies the port map at step 114. This ensures that the port map identifies only output modules 14 available to receive copies of the multicast packet. Switch 10 delivers copies of the packet to all destination output ports in the modified port map at step 116.

Multiplexor 20 also generates a new port map indicating remaining destination output ports at step 118. This new port map indicates output modules 14 that were identified as recipients but were unavailable to receive a copy of the multicast packet during previous iterations. Multiplexor 20 associates the new port map with the multicast packet at step 120 and re-queues the packet at step 106. Therefore, switch 10 iteratively processes the multicast packet to ensure delivery to all appropriate recipients.

Figure 5:
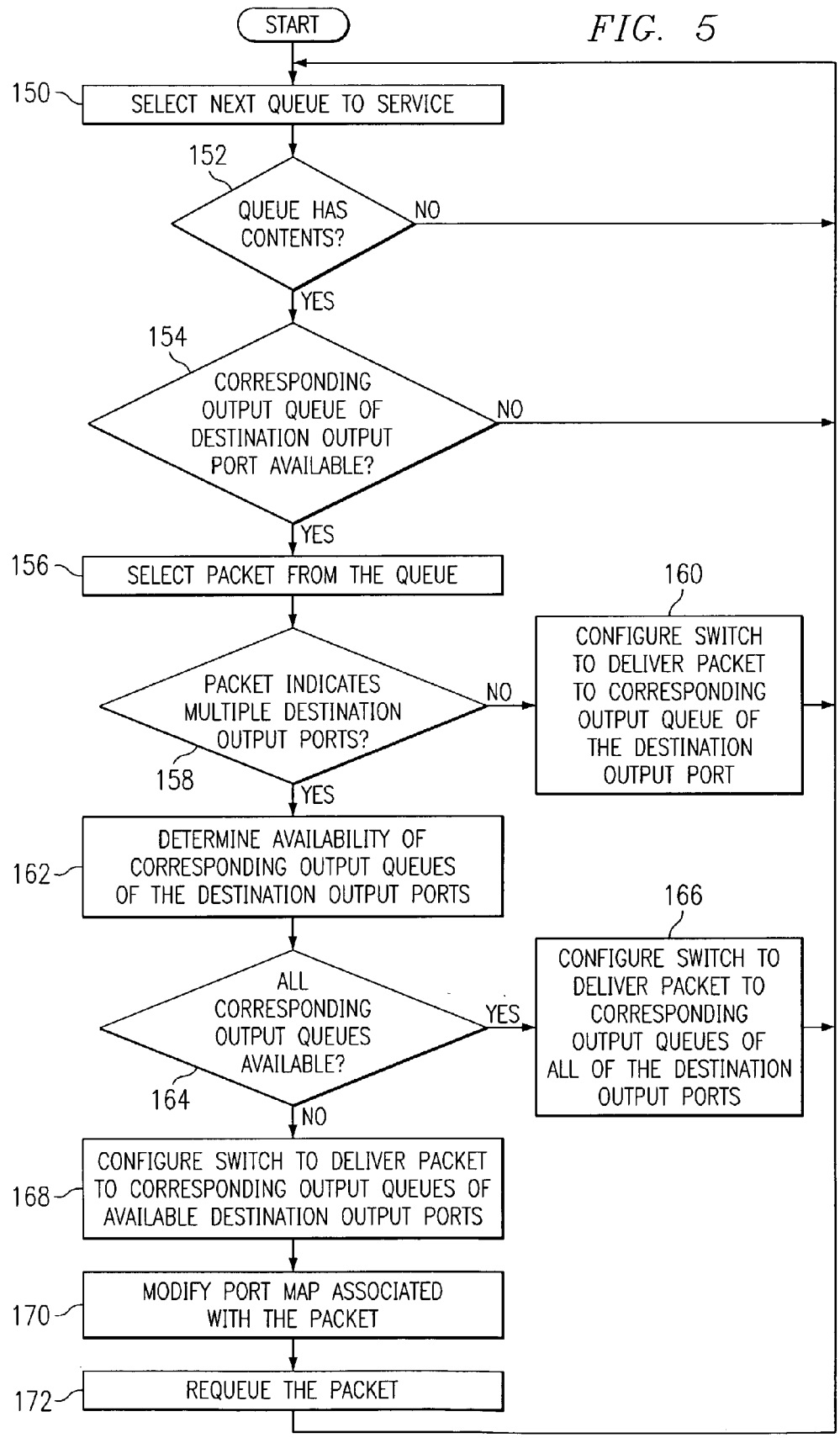
FIG. 5 is a flowchart illustrating the operation of an input module while processing packets, including multicast packets.

FIG. 5 is a flowchart illustrating the operation of input module 12 in processing unicast and multicast packets. Input module 12 identifies the next input queue 18 to service at step 150 and determines whether the queue has contents at step 152. For example, multiplexor 20 may, in a round-robin fashion, identify an input queue 18 and determine whether the identified input queue has contents. If not, multiplexor 20 examines the next input queue 18.

If the identified input queue 18 has contents, input module 12 determines whether the corresponding output queue 22 of the destination output module 14 is available at step 154. For example, multiplexor 20 may access availability information 46 to determine whether output queue 22 corresponding to the identified input queue 18 is available to receive a packet. If not, input module 12 once again selects the next input queue 18 to service at step 150.

However, if an identified input queue 18 has contents and the corresponding output queue 22 is available, input module 12 selects a packet from the queue at step 156. Input module 12 determines whether the packet indicates multiple destination output ports at step 158. For example, input module 12 may determine whether the packet has an associated port map indicating more than one output modules 14. If not, input module 12 configures switch 10 to deliver the packet to the corresponding output queue 22 of the destination output module 14 at step 160 and then selects the next input queue 18 to service at step 150.

However, if the packet indicates multiple destination output ports, input module 12 determines availability of corresponding output queues 22 of all destination output ports at step 162. For example, input module 12 may access availability information 46 for all output modules 14 indicated as recipients. If all corresponding output queues 22 are available at step 164, input module 12 configures switch 10 to deliver copies of the multicast packet to corresponding output queues 22 of all of the destination output ports at step 166.

If some corresponding output queues 22 are unavailable at step 164, input module 12 configures switch 10 to deliver copies of the packet to corresponding output queues 22 of only available destination output ports at step 168. For example, as previously discussed, multiplexor 20 may generate a modified port map indicating only available output modules 14, and switch 10 may deliver copies of the multicast packet only to recipients indicated in the modified port map.

In addition to delivering copies of the multicast packet to available output queues 22, input module 12 modifies the port map associated with the multicast packet at step 170 and re-queues the packet at step 172. After re-queuing the packet, input module 12 selects the next input queue 18 to service at step 150. Therefore, this flowchart illustrates exemplary operation of input module 12 in processing unicast and multicast packets queued in input queues 18.

However, this and the preceding flowchart illustrate only exemplary methods of operation, and switch 10 contemplates using any suitable techniques and elements for processing unicast and multicast packets using correlated input and output queues with distributed scheduling based on backpressure from output queues. Thus, many of the steps in these flowcharts may take place simultaneously and/or in different orders than as shown. In addition, switch 10 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A switch comprising:
N inputs; and
M outputs each comprising N output queues corresponding to the N inputs;
wherein each of the inputs is operable to:
receive a multicast packet for delivery to at least two recipient ones of the outputs;
queue the multicast packet;
determine available ones of the recipient outputs, wherein an available recipient output has availability in the output queue corresponding to the input receiving the multicast packet;
schedule the multicast packet for communication to the available recipient outputs; and
re-queue the multicast packet for delivery to remaining ones of the recipient outputs that were not available.

2. The switch of claim 1, wherein the N inputs each comprise M input queues corresponding to the M outputs.

3. The switch of claim 2, wherein each of the inputs is further operable to:
generate a port map identifying the recipient outputs;
associate the port map with the multicast packet;
select one of the recipient outputs; and
queue the multicast packet in the input queue corresponding to the selected recipient output.

4. The switch of claim 3, wherein each of the inputs is further operable to:
generate a second port map identifying the available recipient outputs; and
schedule the multicast packet for communication to the available recipient outputs by associating the second port map with the multicast packet.

5. The switch of claim 4, wherein each of the inputs is further operable to:
generate a third port map identifying the remaining recipient outputs;
associate the third port map with the multicast packet;
select one of the remaining recipient outputs; and
re-queue the multicast packet in the input queue corresponding to the selected remaining recipient output.

6. The switch of claim 2, wherein each of the inputs is further operable to:
generate a port map identifying the recipient outputs;
associate the port map with the multicast packet; and
queue the multicast packet in the input queues corresponding to the all of the recipient outputs.

7. The switch of claim 6, wherein each of the inputs is further operable to:
generate a second port map identifying the available recipient outputs;
schedule the multicast packet for communication to the available recipient outputs by associating the second port map with the multicast packet;
generate a third port map identifying the remaining recipient outputs;
associate the third port map with the multicast packet; and
remove the multicast packet from the input queues corresponding to the available recipient outputs.

8. The switch of claim 1, wherein each of the inputs is further operable to determine availability of all of the output queues corresponding to the input.

9. The switch of claim 1, further comprising a switching fabric operable to communicate packets from inputs to one or more output queues based on scheduling by each of the inputs.

10. A method for handling multicast packets, the method comprising the steps of:
receiving a multicast packet at one of N inputs of a switch;
determining recipient ones of M outputs of the switch, wherein each of the M outputs comprises N output queues corresponding to the N input;
queuing the multicast packet;
determining available ones of the recipient outputs, wherein an available recipient output has availability in the output queue corresponding to the input receiving the multicast packet;
scheduling the multicast packet for communication to the available recipient outputs; and
if not all of the recipient outputs were available, re-queuing the multicast packet for delivery to remaining ones of the recipient outputs that were not available.

11. The method of claim 10, wherein the N inputs each comprise M input queues corresponding to the M outputs.

12. The method of claim 11, further comprising:
generating a port map identifying the recipient outputs;
associating the port map with the multicast packet;
selecting one of the recipient outputs; and
queuing the multicast packet in the input queue corresponding to the selected recipient output.

13. The method of claim 12, further comprising:
generating a second port map identifying the available recipient outputs; and
scheduling the multicast packet for communication to the available recipient outputs by associating the second port map with the multicast packet.

14. The method of claim 13, further comprising:
generating a third port map identifying the remaining recipient outputs;
associating the third port map with the multicast packet;
selecting one of the remaining recipient outputs; and
re-queuing the multicast packet in the input queue corresponding to the selected remaining recipient output.

15. The method of claim 11, further comprising:
generating a port map identifying the recipient outputs;
associating the port map with the multicast packet; and
queuing the multicast packet in the input queues corresponding to the all of the recipient outputs.

16. The method of claim 15, further comprising:
generating a second port map identifying the available recipient outputs;
scheduling the multicast packet for communication to the available recipient outputs by associating the second port map with the multicast packet;

generating a third port map identifying the remaining recipient outputs;

associating the third port map with the multicast packet; and removing the multicast packet from the input queues corresponding to the available recipient outputs.

17. A program for handling multicast packets, the program encoded in a computer readable medium and operable when executed to perform the steps of:

receiving a multicast packet at one of N inputs of a switch;

determining recipient ones of M outputs of the switch, wherein each of the M outputs comprises N output queues corresponding to the N inputs;

queuing the multicast packet;

determining available ones of the recipient outputs, wherein an available recipient output has availability in the output queue corresponding to the input receiving the multicast packet;

scheduling the multicast packet for communication to the available recipient outputs; and if not all of the recipient outputs were available, re-queuing the multicast packet for delivery to remaining ones of the recipient outputs that were not available.

18. The program of claim 17, wherein the N inputs each comprise M input queues corresponding to the M outputs.

19. The program of claim 18, further operable to:

generate a port map identifying the recipient outputs;

associate the port map with the multicast packet;

select one of the recipient outputs; and queue the multicast packet in the input queue corresponding to the selected recipient output.

20. The program of claim 19, further operable to:

generate a second port map identifying the available recipient outputs; and schedule the multicast packet for communication to the available recipient outputs by associating the second port map with the multicast packet.

21. The program of claim 20, further operable to:

generate a third port map identifying the remaining recipient outputs;

associate the third port map with the multicast packet;

select one of the remaining recipient outputs; and re-queue the multicast packet in the input queue corresponding to the selected remaining recipient output.

22. The program of claim 18, further operable to:

generate a port map identifying the recipient outputs;

associate the port map with the multicast packet; and queue the multicast packet in the input queues corresponding to the all of the recipient outputs.

23. The program of claim 22, further operable to:

generate a second port map identifying the available recipient outputs;

schedule the multicast packet for communication to the available recipient outputs by associating the second port map with the multicast packet;

generate a third port map identifying the remaining recipient outputs;

associate the third port map with the multicast packet; and remove the multicast packet from the input queues corresponding to the available recipient outputs.

24. A switch comprising:

means for receiving a multicast packet at one of N inputs of a switch;

means for determining recipient ones of M outputs of the switch, wherein each of the M outputs comprises N output queues corresponding to the N inputs;

means for queuing the multicast packet;

means for determining available ones of the recipient outputs, wherein an available recipient output has availability in the output queue corresponding to the input receiving the multicast packet;

means for scheduling the multicast packet for communication to the available recipient outputs; and means for, if not all of the recipient outputs were available, re-queuing the multicast packet for delivery to remaining ones of the recipient outputs that were not available.

25. A switch comprising:

N inputs; and

M outputs each comprising N output queues corresponding to the N inputs;

wherein each of the inputs comprises M input queues corresponding to the M outputs and is operable to:

receive a multicast packet for delivery to at least two recipient ones of the outputs;

generate a port map identifying the recipient outputs;

associate the port map with the multicast packet;

select one of the recipient outputs;

queue the multicast packet in the input queue corresponding to the selected recipient output;

determine available ones of the recipient outputs, wherein an available recipient output has availability in the output queue corresponding to the input receiving the multicast packet;

generate a second port map identifying the available recipient outputs;

associate the second port map with the multicast packet to schedule the multicast packet for communication to the available recipient outputs;

generate a third port map identifying the remaining recipient outputs;

associate the third port map with the multicast packet;

select one of the remaining recipient outputs; and re-queue the multicast packet and the associated third port map in the input queue corresponding to the selected remaining recipient output.

* * * * *